United States Patent
Tan et al.

(10) Patent No.: US 12,060,863 B2
(45) Date of Patent: Aug. 13, 2024

(54) CHORDWISE SEGMENT CONNECTION STRUCTURE FOR WIND TURBINE BLADES

(71) Applicant: NEWTECH GROUP CO., LTD., Changzhou (CN)

(72) Inventors: Kunlun Tan, Changzhou (CN); Yelin Liu, Changzhou (CN); Gaoyu Bai, Changzhou (CN); Qiuping Du, Changzhou (CN); Lei Cao, Changzhou (CN); Juncheng Chen, Changzhou (CN)

(73) Assignee: NEWTECH GROUP CO., LTD., Jiangsu (CN)

( * ) Notice: Subject to any disclaimer, the term of this patent is extended or adjusted under 35 U.S.C. 154(b) by 0 days.

(21) Appl. No.: 18/225,536

(22) Filed: Jul. 24, 2023

(65) Prior Publication Data
US 2023/0366374 A1 Nov. 16, 2023

Related U.S. Application Data

(63) Continuation of application No. PCT/CN2023/070068, filed on Jan. 3, 2023.

(30) Foreign Application Priority Data

Nov. 10, 2021 (CN) .......................... 202111328542.8

(51) Int. Cl.
*F03D 1/06* (2006.01)
*B29C 65/48* (2006.01)

(52) U.S. Cl.
CPC ......... *F03D 1/0682* (2023.08); *F03D 1/0675* (2013.01); *F03D 1/0684* (2023.08);
(Continued)

(58) Field of Classification Search
CPC ............................ F03D 1/0675; F03D 1/0682
See application file for complete search history.

(56) References Cited

U.S. PATENT DOCUMENTS

| 8,480,371 B2 * | 7/2013 | Esaki | .................... F03D 1/0675 416/229 R |
| 8,961,142 B2 * | 2/2015 | Wansink | ............... F03D 1/0675 416/241 A |

(Continued)

FOREIGN PATENT DOCUMENTS

| CN | 105526044 A | * | 4/2016 |
| CN | 107073888 A | | 8/2017 |

(Continued)

OTHER PUBLICATIONS

English Translation of WIPO Search Opinion for PCT/CN2023/070068 (Year: 2023).*

(Continued)

*Primary Examiner* — Woody A Lee, Jr.
*Assistant Examiner* — Esley Le Fisher
(74) *Attorney, Agent, or Firm* — SZDC Law PC

(57) ABSTRACT

A chordwise segment connection structure for wind turbine blades includes: a blade body including a pressure side and a suction side; a leading edge shell and a trailing edge shell formed by the skin of the pressure side and the suction side along the chord length of the blade, the pressure side and the suction side being each provided with a spar cap; and a shear web provided in a cavity of the blade body and extending between the pressure side and the suction side to support the spar cap; wherein the spar caps on the pressure side and the suction side are bonded and fixed to a skin structure where the leading edge shell and the trailing edge shell are spliced, (Continued)

so that the leading edge shell and the trailing edge shell are spliced with the spar caps to form the profile of the wind turbine blade.

7 Claims, 9 Drawing Sheets

(52) U.S. Cl.
CPC .............. *B29C 65/48* (2013.01); *F03D 1/069* (2023.08); *F05B 2240/302* (2013.01)

(56) References Cited

U.S. PATENT DOCUMENTS

| | | | | |
|---|---|---|---|---|
| 9,719,489 | B2* | 8/2017 | Stewart | F03D 1/0675 |
| 10,821,696 | B2* | 11/2020 | Roberts | B29C 70/682 |
| 10,830,206 | B2* | 11/2020 | Tobin | B33Y 80/00 |
| 10,961,982 | B2* | 3/2021 | Broome | B29C 65/18 |
| 11,098,691 | B2* | 8/2021 | Tobin | F03D 1/0675 |
| 11,248,587 | B2* | 2/2022 | Christiansen | F03D 1/0675 |
| 11,466,661 | B2* | 10/2022 | Warzok | F03D 1/0675 |
| 2013/0315747 | A1 | 11/2013 | Schibsbye | |
| 2014/0348659 | A1 | 11/2014 | Stewart | |
| 2015/0308404 | A1 | 10/2015 | Dahl et al. | |
| 2016/0040651 | A1 | 2/2016 | Yarbrough et al. | |
| 2017/0058862 | A1* | 3/2017 | Caruso | B29C 66/72141 |
| 2017/0058866 | A1* | 3/2017 | Caruso | F03D 1/0675 |
| 2018/0142670 | A1 | 5/2018 | Garm | |
| 2020/0340446 | A1 | 10/2020 | Girolamo | |
| 2021/0246868 | A1 | 8/2021 | Smith et al. | |

FOREIGN PATENT DOCUMENTS

| | | | | |
|---|---|---|---|---|
| CN | 211008948 U | | 7/2020 | |
| CN | 106662070 B | * | 9/2020 | ............ B29C 65/48 |
| CN | 113958447 A | | 2/2022 | |
| EP | 3002452 A1 | * | 4/2016 | ........... F03D 1/0675 |

OTHER PUBLICATIONS

English translation of CN106662070B (Year: 2020).*
English translation of CN105526044A (Year: 2016).*

* cited by examiner

CHORDWISE SEGMENT CONNECTION STRUCTURE FOR WIND TURBINE BLADES

This application is a Continuation Application of PCT/CN2023/070068, filed on Jan. 3, 2023, which claims priority to Chinese Patent Application No. 202111328542.8, filed on Nov. 10, 2021, which is incorporated by reference for all purposes as if fully set forth herein.

TECHNICAL FIELD

The present invention relates to the field of wind turbine blade technology, in particular to a chordwise segment connection structure for wind turbine blades.

BACKGROUND

Wind turbine blades are the basic components of wind turbines that convert wind energy into electrical energy. The blade has the cross-sectional profile of a wing. During operation, the air flowing through the blade creates a pressure difference between its two sides, so that the lift from the pressure side to the suction side acts on the blade, and the lift generates torque on the main rotor shaft, which is connected by gears to a generator that can generate electricity.

In order to make full use of wind energy resources, wind turbines are gradually becoming larger and their blade lengths are also increasing. Rich wind resources are almost in remote areas, desert areas, offshore or seaside areas and other uninhabited areas with poor transportation conditions, making it quite difficult to transport long blades. At present, some wind turbine blades are segmented along the length direction. However, nowadays, wind turbine blades are becoming increasingly larger and thicker, and being segmented along their length direction alone cannot meet transportation conditions.

In the existing modular wind turbine blades, several segments are arranged along the length direction. Each segment is provided with a leading edge portion, an intermediate portion and a trailing edge portion in the width direction of the wind turbine blade. Between the leading edge portion and the intermediate portion, and between the intermediate portion and the trailing edge portion is provided a splicing surface and a connecting structure which passes through the splicing surface for mechanical connection or hybrid connection with adhesive. However, mechanical and hybrid connections involve metal connections, which can increase the weight of the blades. At the same time, considering lightning protection design, it will inevitably increase the cost beyond the connection.

SUMMARY

The technical problem to be solved by the present invention is to provide a chordwise segment connection structure for modularized wind turbine blades, which overcomes the disadvantages of mechanical connection and hybrid connection, and makes the design structure of wind turbine blades meet the sealing requirements.

To this end, the present invention provides a chordwise segment connection structure for modularized wind turbine blades, comprising: a blade body including a pressure side and a suction side;
a leading edge shell and a trailing edge shell formed by the skin of the pressure side and the suction side along the chord length of the blade, the pressure side and the suction side between the leading edge shell and the trailing edge shell being each provided with a spar cap;
a shear web provided in a cavity of the blade body and extending between the pressure side and the suction side to support the spar cap;
wherein the spar caps on the pressure side and the suction side are bonded and fixed to a skin structure where the leading edge shell and the trailing edge shell are spliced, so that the leading edge shell and the trailing edge shell are spliced with the spar caps to form the profile of the wind turbine blade.

Further, the spar cap is provided between an inner skin and an outer skin of the skin structure, and is integrally infused with the leading edge shell and the trailing edge shell at the pressure side and the suction side, and an edge extends from the end of the shear web close to the spar cap and is bonded to the inner skin on which the spar cap is located.

Further, the spar cap is provided on the inside of the inner skin of the skin structure, the inner skin is bent towards the outside, the leading edge shell and the trailing edge shell are integrally formed in the chord length direction, and the spar cap and the shear web are bonded and fixed on the inside of the inner skin after being integrally formed.

Further, a trailing edge web is provided within the trailing edge shell and parallel to the shear web, an edge extending from the trailing edge web is bonded and fixed to the inner skin of the trailing edge shell.

Further, the spar cap is provided on the outside of the outer skin of the skin structure, the skin structure being bent towards the inside of the cavity to form a first connection surface and a second connection surface located at either end of the first connection surface, and the first connection surface being of an arc-shaped structure projecting towards the outside and the second connection surface being of a planar structure.

wherein the spar cap is bonded and fixed to the first connection surface and the second connection surface by means of a structural adhesive layer, and the spar cap is provided with a reinforcement layer on the outside, the reinforcement layer being spliced to the outer skin of the leading edge shell and the trailing edge shell, and the shear web being bonded to the inner skin on which the spar cap is located.

Further, the leading edge shell has a chamfered transition at the splice between the pressure side and the suction side.

wherein the trailing edge shell comprises a trailing edge module and an intermediate module, the intermediate module including a trailing edge web provided at the splice and a first receiving surface and a second receiving surface extending along both ends of the trailing edge web towards the leading edge shell; and wherein a bonding corner layer is provided at the splice of the trailing edge module and the intermediate module, one side of the bonding corner layer being bonded and fixed to the trailing edge web and the other side forming a splicing surface with the first receiving surface or the second receiving surface, the splicing surface being bonded and fixed to the inside of the inner skin of the trailing edge module by means of a structural adhesive layer.

Further, a reinforcement structure is provided at the corner formed between the splicing surface and the inside of the inner skin of the trailing edge module, the trailing edge web and the first receiving surface or the second receiving surface close to the reinforcement structure forming a rounded structure on the outer side thereof and an R-angle structure on the inner side thereof.

wherein both the rounded structure and the R-angle structure are provided with a hand layup reinforcement layer.

Further, a corner reinforcement layer is provided at the joint between the shear web and the inner skin, the corner reinforcement layer being an L-shaped structure, and a resin paste layer is added at the gap of the corner reinforcement layer.

A structural adhesive layer is provided at the corner reinforcement layer close to the trailing edge shell, and a horizontal connection part of the corner reinforcement layer is fixedly connected to the inner skin by means of the structural adhesive layer.

Further, the trailing edge module is provided with a wraparound reinforcement layer on the outside of the outer skin of a trailing edge beam.

wherein the trailing edge beam is provided between the inner skin and the outer skin, and a structural adhesive layer is provided between the trailing edge beam and the inner skin.

Further, the width of the spar cap on the pressure side is greater than that of the spar cap on the suction side.

The present invention is advantageous in that by providing a shear web in the cavity of the blade body, which shear web extends between the pressure side and the suction side to support the spar cap, and by bonding and fixing the spar caps on the pressure side and the suction side to the skin structure where the leading edge shell and the trailing edge shell are spliced, so that the leading edge shell and the trailing edge shell are spliced with the spar caps to form the profile of the wind turbine blade, the bonding structure at the skin structure, compared with existing connection forms, overcomes the drawbacks of mechanical and hybrid connections, achieves the goal of reducing blade weight and cost, and meets the sealing requirements of wind turbine blade structures. This is of great significance for accelerating the development of the wind power industry.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

Reference signs: 1. Pressure side; 2. Suction side; 3. Leading edge shell; 4. Trailing edge shell; 41. Trailing edge module; 42. Intermediate module; 5. Spar cap; 6. Shear web; 7. Skin structure; a. First connection surface; b. Second connection surface; 8. Edge; 9. Trailing edge web; 10. Chamfered transition; 11. Splicing surface; 12. Reinforcement structure; 13. Corner enhancement layer; 14. Wraparound reinforcement layer; 15. Bonding corner layer; 16. Trailing edge beam; c. Enhancement layer; d. First receiving surface; e. Second receiving surface; f. Rounded structure; g. R-angle structure; h. Resin paste layer; i. Structural adhesive layer.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a portion of the embodiments of the present invention, rather than all the embodiments.

It should be noted that when an element is referred to as being "fixed to" another element, it can be directly on the element or an intermediate element may also be present. It should be noted that when an element is referred to as being "connected to" another element, it can be directly on the element or an intermediate element may also be present. The terms "vertical", "horizontal", "left", "right" and similar expressions used herein are for illustrative purposes only and do not mean that they are the only mode of implementation.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

Embodiment 1

Figure 1:
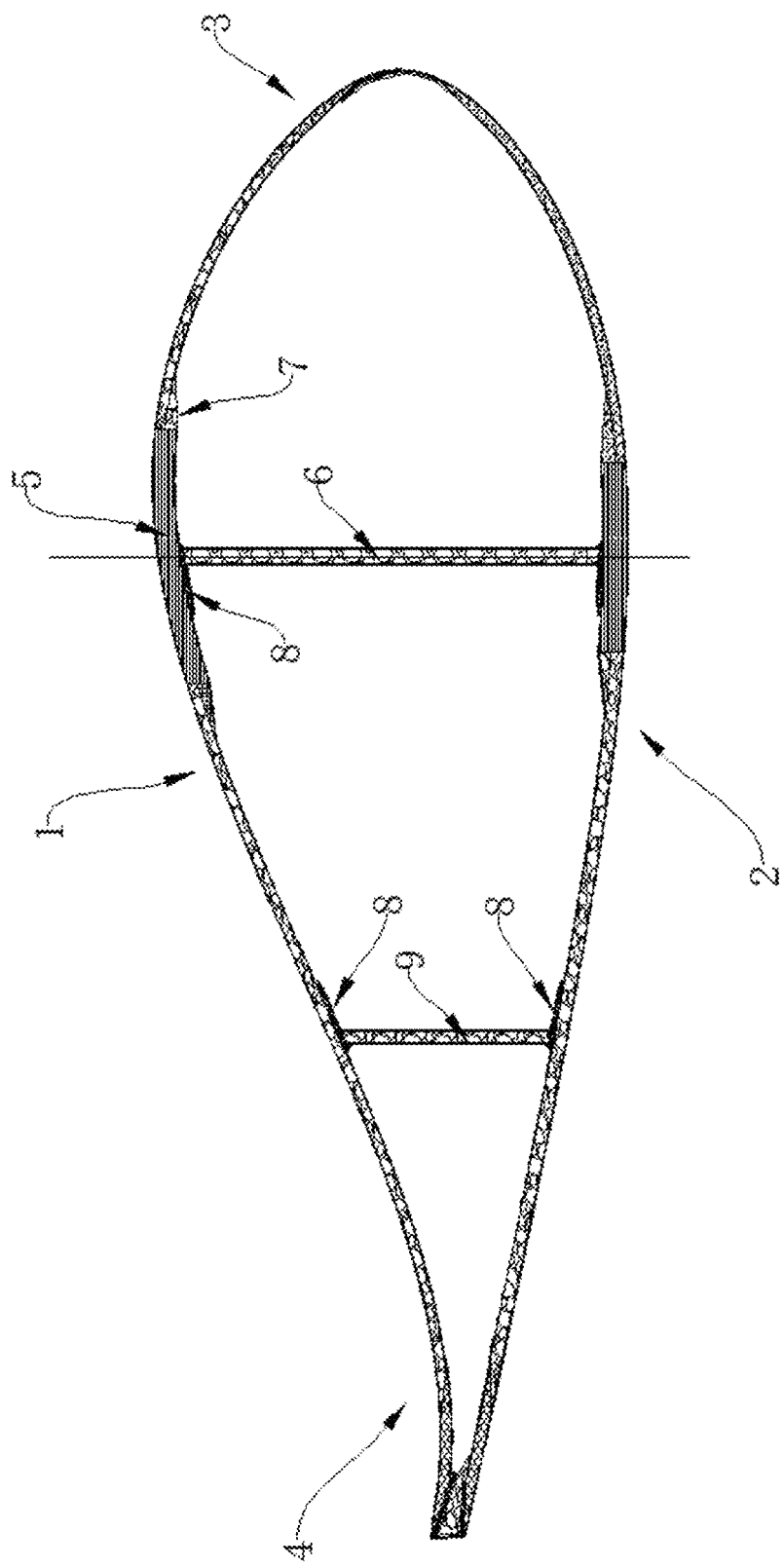
FIG. 1 is a schematic structural diagram of the chordwise segment connection structure for modularized wind turbine blades in Embodiment 1 of the present invention.

FIG. 1 illustrates a chordwise segment connection structure for modularized wind turbine blades, comprising: a blade body including a pressure side 1 and a suction side 2; a leading edge shell 3 and a trailing edge shell 4 formed by the skin of the pressure side 1 and the suction side 2 along the chord length of the blade, the pressure side 1 and the suction side 2 between the leading edge shell 3 and the trailing edge shell 4 being each provided with a spar cap 5; and a shear web 6 provided in a cavity of the blade body and extending between the pressure side 1 and the suction side 2 to support the spar cap 5; wherein the spar caps 5 on the pressure side 1 and the suction side 2 are bonded and fixed to a skin structure 7 where the leading edge shell 3 and the trailing edge shell 4 are spliced, so that the leading edge shell 3 and the trailing edge shell 4 are spliced with the spar caps 5 to form the profile of the wind turbine blade.

Specifically, the bonding structure at the skin structure 7, compared with existing connection forms, overcomes the drawbacks of mechanical and hybrid connections, achieves the goal of reducing blade weight and cost, and meets the sealing requirements of wind turbine blade structures. This is of great significance for accelerating the development of the wind power industry.

In a preferred embodiment of the present invention, the spar cap 5 is provided between an inner skin and an outer skin of the skin structure 7, and is integrally infused with the leading edge shell 3 and the trailing edge shell 4 at the pressure side 1 and the suction side 2. An edge 8 extends from the end of the shear web 6 close to the spar cap 5 and is bonded to the inner skin on which the spar cap 5 is located.

Specifically, the shear web 6 and the leading and trailing edges are bonded to form an overall load-bearing structure, improving the ability of the shear web 6 to withstand shear forces and ensuring the overall stability of the blades.

To reduce the weight of the trailing edge structure, a trailing edge web 9 is provided within the trailing edge shell 4 and is parallel to the shear web 6. An edge 8 extending from the trailing edge web is bonded and fixed to the inner skin of the trailing edge shell 4, in order to improve the overall stability of the trailing edge shell 4.

Figure 12:
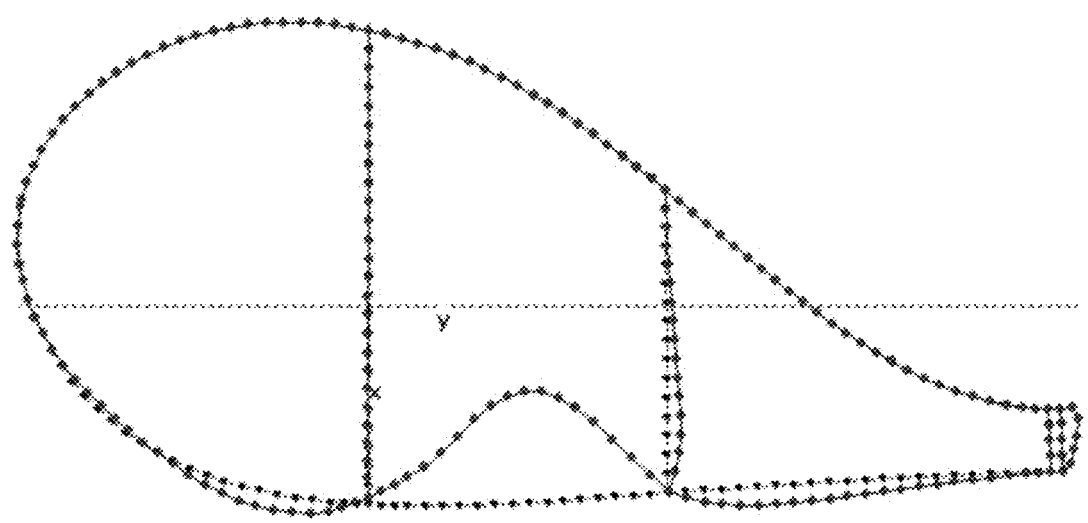
FIG. 12 illustrates the buckling stability analysis for the spar cap on the suction side whose width is 315 mm according to the embodiments of the present invention.
Figure 13:
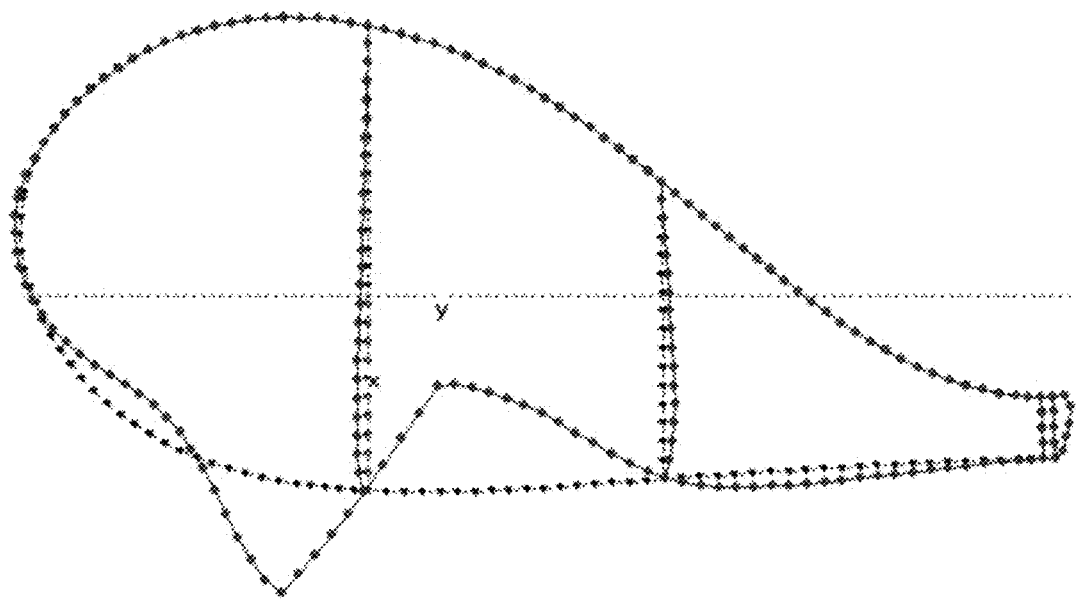
FIG. 13 illustrates the buckling stability analysis for the spar cap on the suction side whose width is 600 mm according to the embodiments of the present invention.

The I-beam structure of the traditional blades adopts a structure in which the spar cap on the pressure side 1 and the spar cap on the suction side 2 have the same width. Under the condition that the height of the beam remains unchanged (aerodynamic profile is determined), increasing the width can improve the blade stiffness, but the stability is not guaranteed. Therefore, in order to meet the stiffness requirements while ensuring stability, the width of the spar cap 5 on the pressure side 1 is larger than that of the spar cap 5 on the suction side 2. For example, when the width of the spar cap 5 on the pressure side 1 is fixed, the maximum swing conditions are analyzed for two cases where the spar cap on the suction side face 2 has a width of 315 mm and 600 mm respectively. The width of the spar cap 5 on the pressure side 1 is between 315 mm and 600 mm. As shown in FIGS. 12-13, a certain cross-section is selected for analysis. The structure with a spar cap width of 315 mm has a buckling factor of 2.72 and the structure with a spar cap width of 600 mm has a buckling factor of 2.17, that is, the stiffness of the structure with a spar cap width of 315 mm is greater than that of the structure with a spar cap width of 600 mm. Therefore, the stability of the narrow beam is much higher than that of the wide beam in the case of equal stiffness.

Embodiment 2

Figure 2:
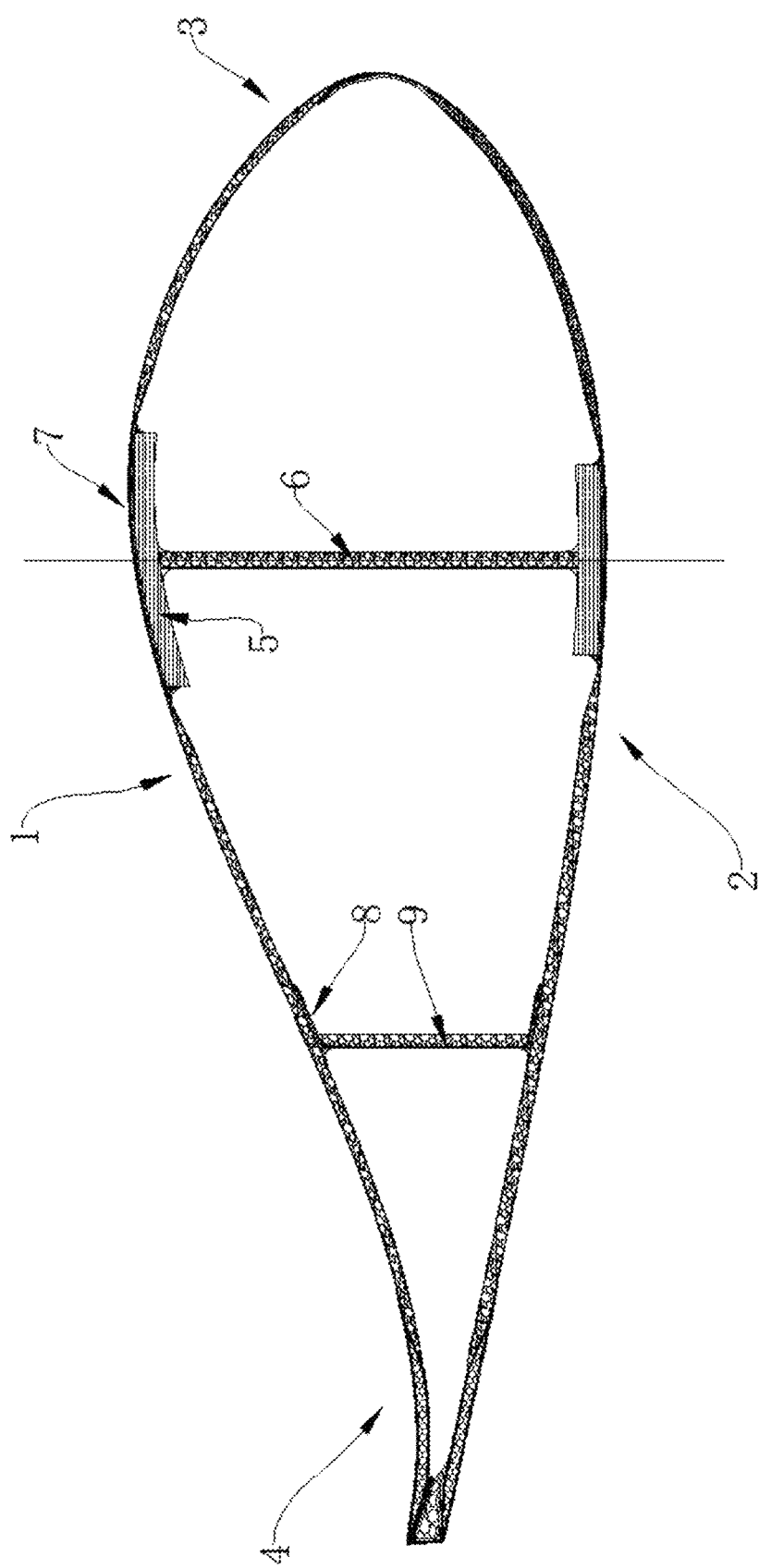
FIG. 2 is a schematic structural diagram of the chordwise segment connection structure for modularized wind turbine blades in Embodiment 2 of the present invention.
Figure 3:
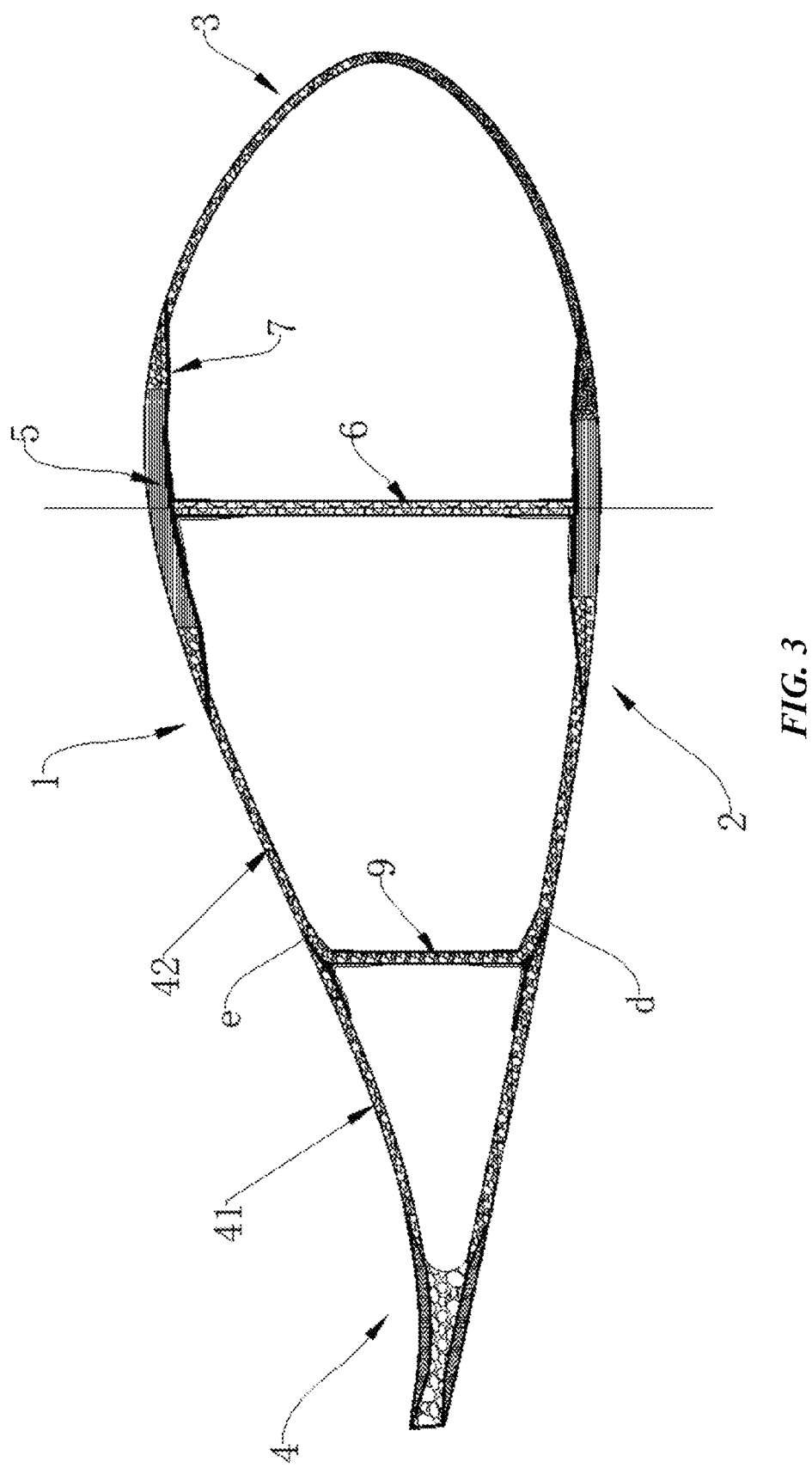
FIG. 3 is a schematic structural diagram of the chordwise segment connection structure for modularized wind turbine blades in Embodiment 3 of the present invention.

The differences between this embodiment and Embodiment 1 lie in that, as shown in FIG. 2, the spar cap 5 is provided on the inside of the inner skin of the skin structure 7. The inner skin is bent towards the outside, the leading edge shell 3 and the trailing edge shell 4 are integrally formed in the chord length direction, and the spar cap 5 and the shear web 6 are bonded and fixed on the inside of the inner skin after being integrally formed.

Specifically, the leading edge shell 3 and trailing edge shell 4 are integrally formed along the chord length direction, reducing the connection points and improving the overall stability. The shear web 6 and spar cap 5 are integrally formed and bonded to the inside of the inner skin which is bent to the outside, further improving the shear resistance.

Embodiment 3

The differences between this embodiment and Embodiments 1-2 lie in that the blade is divided into three segments along the chord length and these segments are fixed by bonding, avoiding the bonding problem of the leading and trailing edges, and in that the spar cap 5 is provided on the outside of the skin structure 7.

FIGS. 3-9 illustrate a chordwise segment connection structure for modularized wind turbine blades, comprising: a blade body including a pressure side 1 and a suction side 2; a leading edge shell 3 and a trailing edge shell 4 formed by the skin of the pressure side 1 and the suction side 2 along the chord length of the blade, the pressure side 1 and the suction side 2 between the leading edge shell 3 and the trailing edge shell 4 being provided with a spar cap 5; and a shear web 6 provided in a cavity of the blade body and extending between the pressure side 1 and the suction side 2 to support the spar cap 5; wherein the spar caps 5 on the pressure side 1 and the suction side 2 are bonded and fixed to a skin structure 7 where the leading edge shell 3 and the trailing edge shell 4 are spliced, so that the leading edge shell 3 and the trailing edge shell 4 are spliced with the spar caps 5 to form the profile of the wind turbine blade.

Specifically, the bonding structure at the skin structure 7, as compared with existing connection forms, overcomes the drawbacks of mechanical and hybrid connections, achieves the goal of reducing blade weight and cost, and meets the sealing requirements of wind turbine blade structures. This is of great significance for accelerating the development of the wind power industry.

Figure 4:
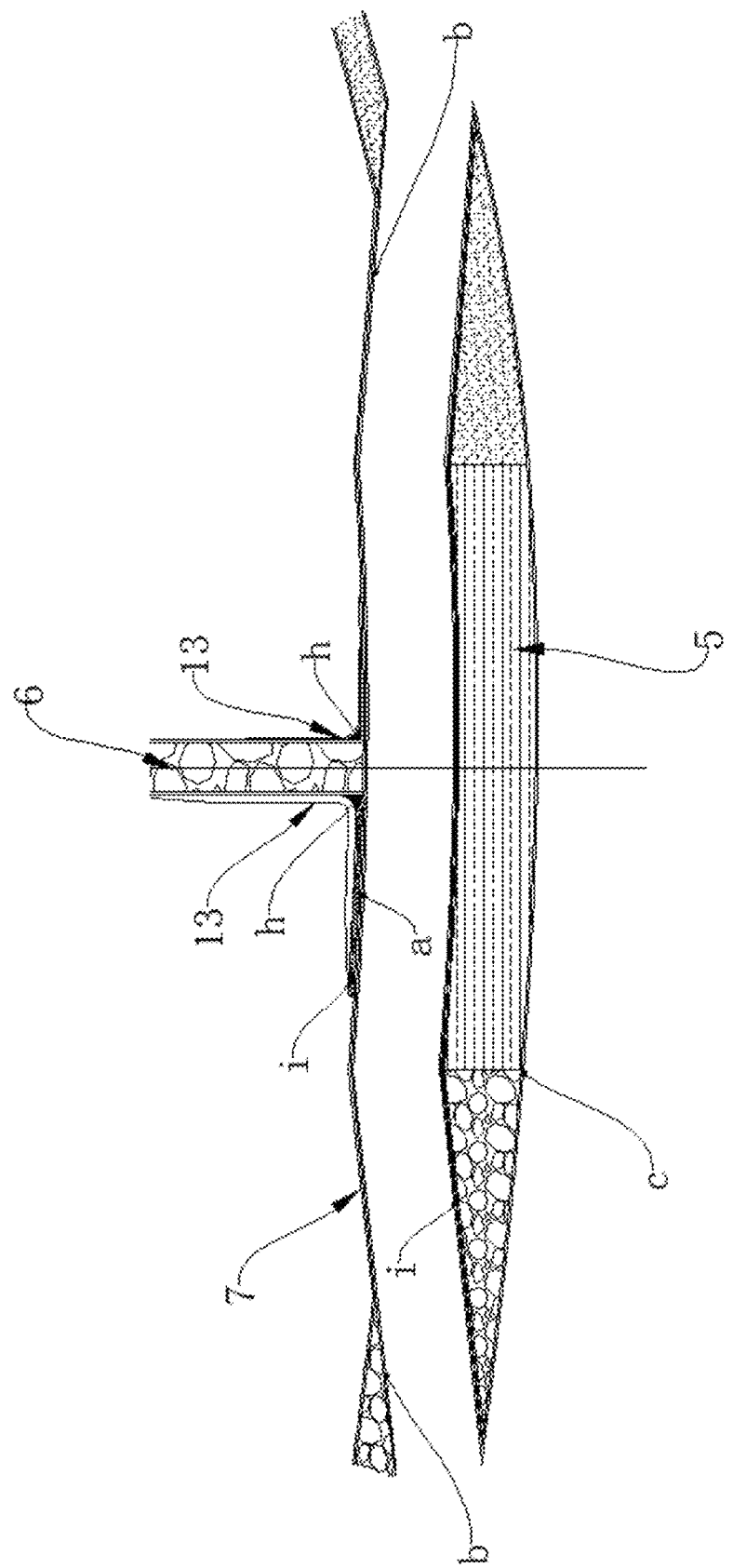
FIG. 4 is a schematic exploded diagram of the skin structure and the spar cap in Embodiment 3 of the present invention.
Figure 5:
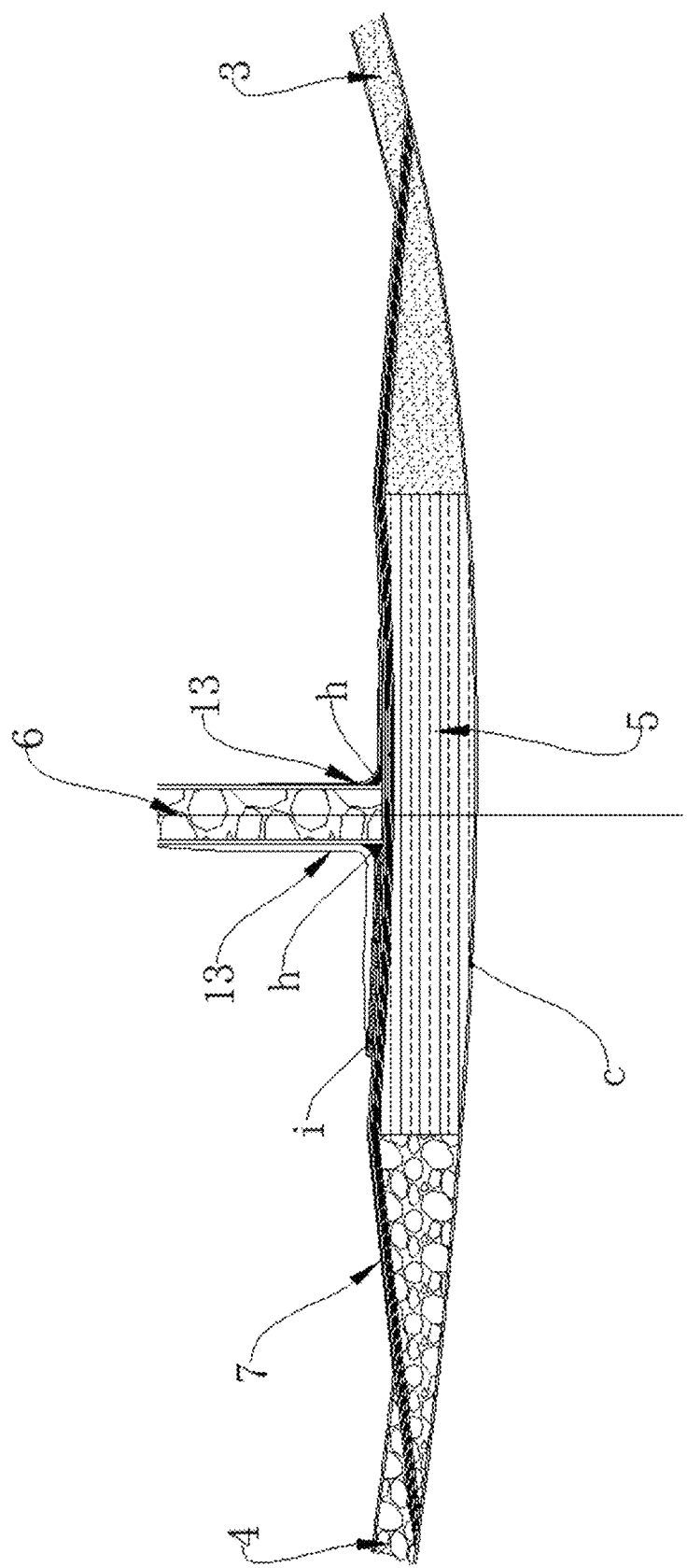
FIG. 5 is the structural representation of the connection between the skin structure and the spar cap in Example 3 of the present invention.

As shown in FIGS. 4-5, the spar cap 5 is provided on the outside of the outer skin of the skin structure 7. The skin structure 7 is bent towards the inside of the cavity to form a first connection surface a and a second connection surface b located at either end of the first connection surface a. The first connection surface a is of an arc-shaped structure projecting towards the outside and the second connection surface b is of a planar structure. The spar cap 5 is bonded and fixed to the first connection surface a and the second connection surface b by means of a structural adhesive layer i. The spar cap 5 is provided with a reinforcement layer c on the outside. The reinforcement layer c is spliced to the outer skin of the leading edge shell 3 and the trailing edge shell 4, and the shear web 6 is bonded to the inner skin on which the spar cap 5 is located.

Specifically, the first connection surface a and the two second connection surfaces b form a boat-shaped structure, and the spar cap 5 is fixed through the structural adhesive layer i, increasing the bonding area of the web and improving the reliability of the connection. In addition, the reinforcement layer c on the outside of the spar cap 5 ensures the aerodynamic shape of the blade and improves the shear resistance of the beam.

Figure 6:
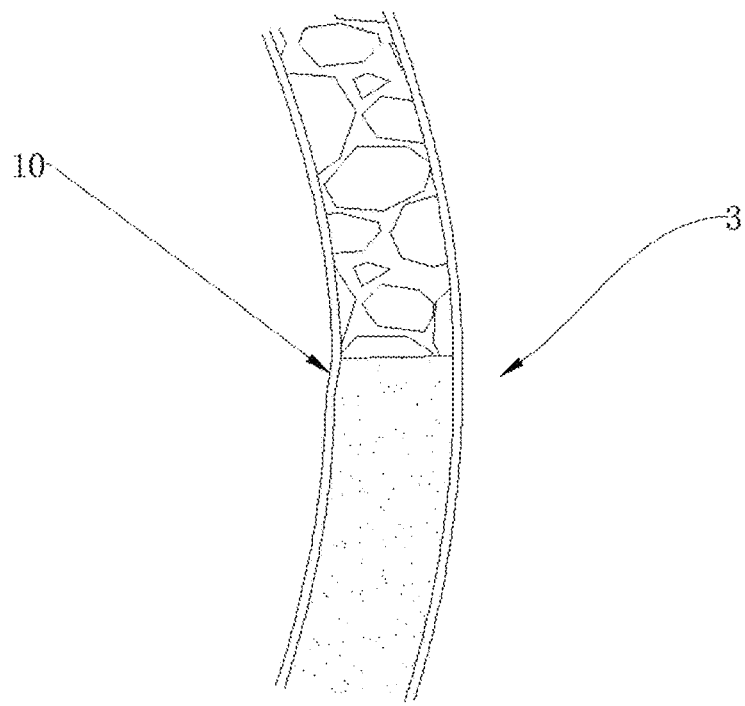
FIG. 6 is a schematic structural diagram of the chamfered transition in Embodiment 3 of the present invention.
Figure 7:
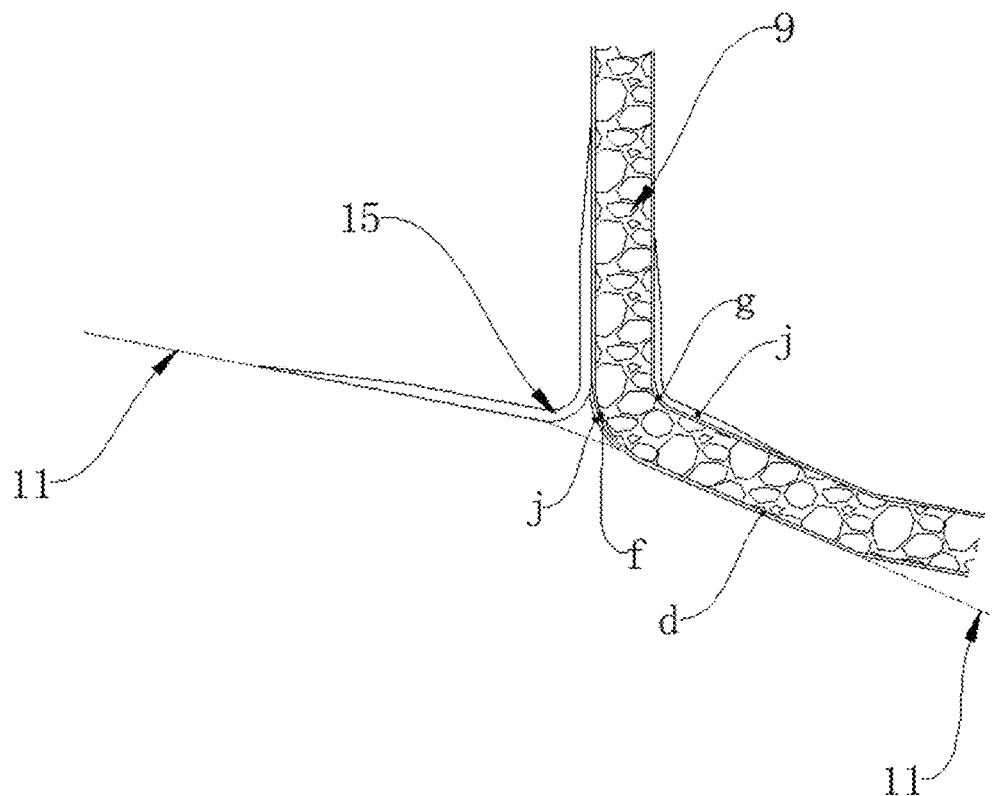
FIG. 7 is a schematic diagram of the splicing surface structure in Embodiment 3 of the present invention.
Figure 8:
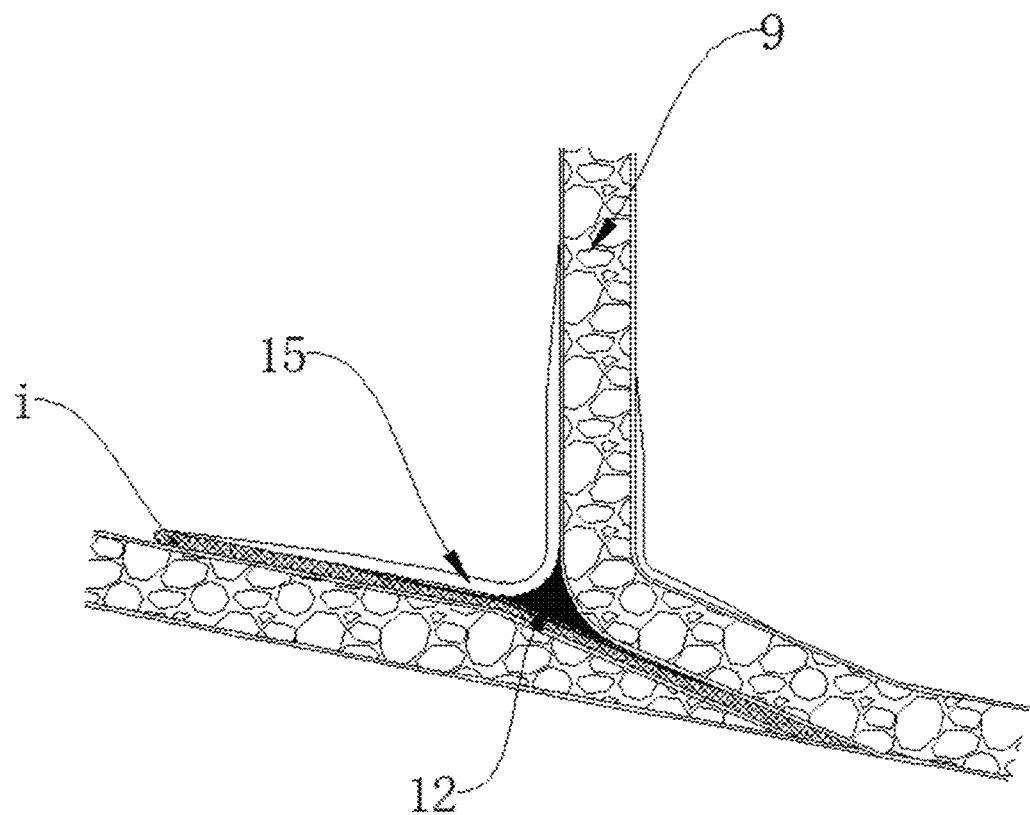
FIG. 8 is the structural representation of the connection between the trailing edge module and the intermediate module in Embodiment 3 of the present invention.

The leading edge shell 3 of the blade is designed to adopt core materials with different thicknesses to ensure the stability of the leading edge shell 3. There is a transition difference at the splice of core materials of different thicknesses, which can easily lead to instability of the leading edge when it is under load. Therefore, as shown in FIG. 6, the splice of the pressure side 1 and the suction side 2 of the leading edge shell 3 adopts a chamfered transition 10. In addition, in order to adapt to the gradual increase of the chord length, as shown in the FIG. 3, the trailing edge shell 4 includes a trailing edge module 41 and an intermediate module 42. The intermediate module 42 includes a trailing edge web 9 provided at the splice and a first receiving surface d and a second receiving surface e extending along both ends of the trailing edge web 9 towards the leading edge shell 3. As shown in FIG. 7, a bonding corner layer 15 is provided at the splice of the trailing edge module 41 and the intermediate module 42. One side of the bonding corner layer 15 is bonded and fixed to the trailing edge web 9 and the other side forms a splicing surface 11 with the first receiving surface d and/or the second receiving surface e. The splicing surface 11 is bonded and fixed to the inside of the inner skin of the trailing edge module 41 by means of a structural adhesive layer i. By three-segment assembly, the present invention avoids the traditional bonding problem of the leading and trailing edges.

In order to avoid minor damage during the demolding process to reduce the strength of the structure, as shown in FIG. 7, a reinforcement structure 12 is provided at the corner formed between the splicing surface 11 and the inside of the inner skin of the trailing edge module 41. The trailing edge web 9 and the first receiving surface d or the second receiving surface e close to the reinforcement structure 12 form a rounded structure f on the outer side thereof and an B-angle structure g on the inner side thereof. Both the rounded structure f and the R-angle structure g are provided with a hand layup reinforcement layer j.

Specifically, after the intermediate module 42 is formed, its two corners towards the trailing edge module 41 need to be rounded to ensure the overall strength of the splice. The B-angle structure g is the inner corner of the intermediate module 42 towards the leading edge shell 3, which is due to a second bending at the splice of the outer skin, ensuring the connection strength of the intermediate module 42 and the trailing edge module 41 and improving the blade's ability to withstand aerodynamic forces.

As shown in FIGS. 4-5, a corner reinforcement layer 13 is provided at the joint between the shear web 6 and the inner skin. The corner reinforcement layer 13 is an L-shaped structure, and a resin paste layer h is added at the gap of the corner reinforcement layer 13. A structural adhesive layer i is provided at the corner reinforcement layer 13 close to the trailing edge shell 4, and a horizontal connection part of the corner reinforcement layer 13 is fixedly connected to the inner skin by means of the structural adhesive layer i.

Specifically, the reinforcement at the corner and the provision of the structural adhesive layer i improve the performance and quality at the bonding position and ensure the ability of the web to withstand shear forces.

Figure 9:
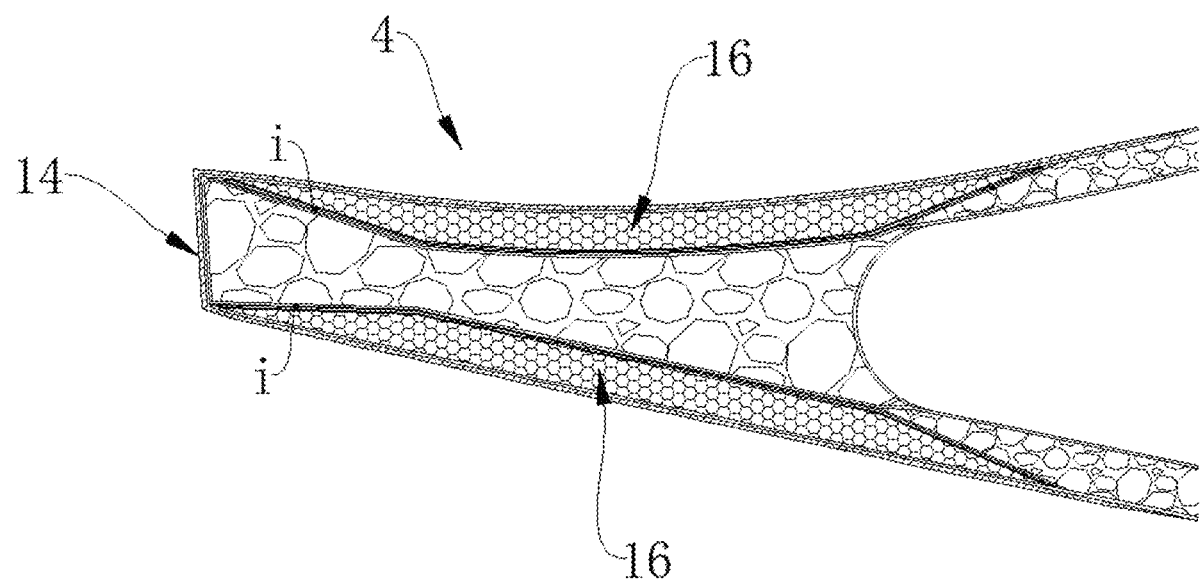
FIG. 9 is a schematic structural diagram of the wraparound reinforcement layer in Embodiment 3 of the present invention.

As shown in FIG. 9, the trailing edge module 41 is provided with a wraparound reinforcement layer 14 on the outside of the outer skin of a trailing edge beam 16. The trailing edge beam 16 is provided between the inner skin and the outer skin, and a structural adhesive layer i is provided between the trailing edge beam 16 and the inner skin to increase the load bearing capacity of the trailing edge beam 16 and improve the stability of the trailing edge module 41.

The I-beam structure of the traditional blades adopts a structure in which the spar cap on the pressure side 1 and the spar cap on the suction side 2 have the same width. Under the condition that the height of the beam remains unchanged (aerodynamic profile is determined), increasing the width can improve the blade stiffness, but the stability is not guaranteed. Therefore, in order to meet the stiffness requirements while ensuring stability, the width of the spar cap 5 on the pressure side 1 is larger than that of the spar cap 5 on the suction side 2. For example, when the width of the spar cap 5 on the pressure side 1 is fixed, the maximum swing conditions are analyzed for two cases where the spar cap on the suction side face 2 has a width of 315 mm and 600 mm respectively. The width of the spar cap 5 on the pressure side 1 is between 315 mm and 600 mm. As shown in FIGS. 12-13, a certain cross-section is selected for analysis. The structure with a spar cap width of 315 mm has a buckling factor of 2.72 and the structure with a spar cap width of 600 mm has a buckling factor of 2.17, that is, the stiffness of the structure with a spar cap width of 315 mm is greater than that of the structure with a spar cap width of 600 mm. Therefore, the stability of the narrow beam is much higher than that of the wide beam in the case of equal stiffness.

Embodiment 4

Figure 10:
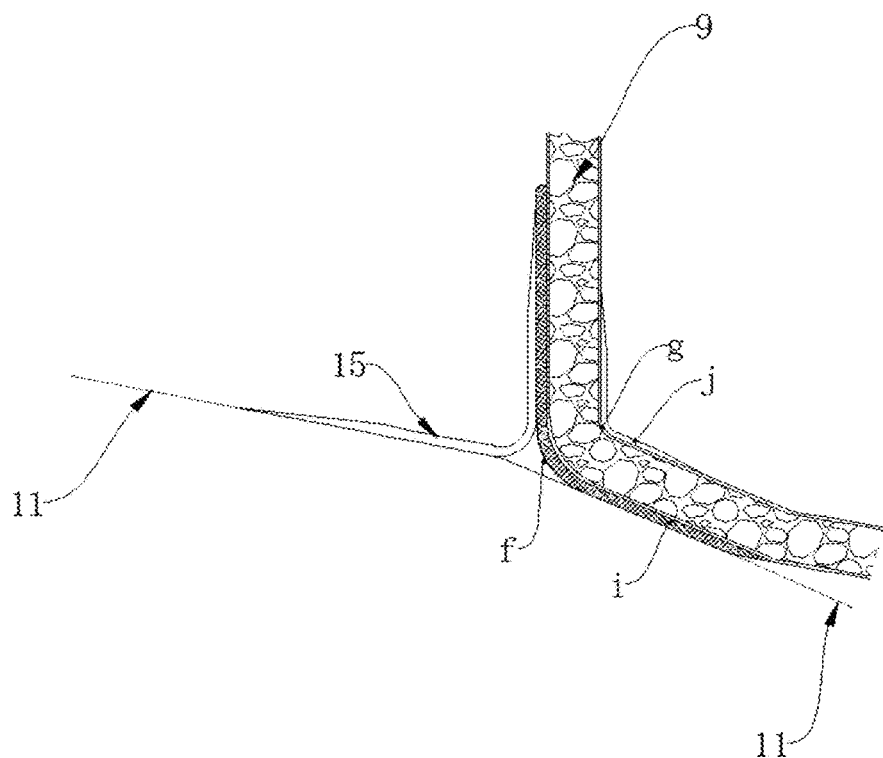
FIG. 10 is a schematic diagram of another splicing surface structure in Embodiment 4 of the present invention.
Figure 11:
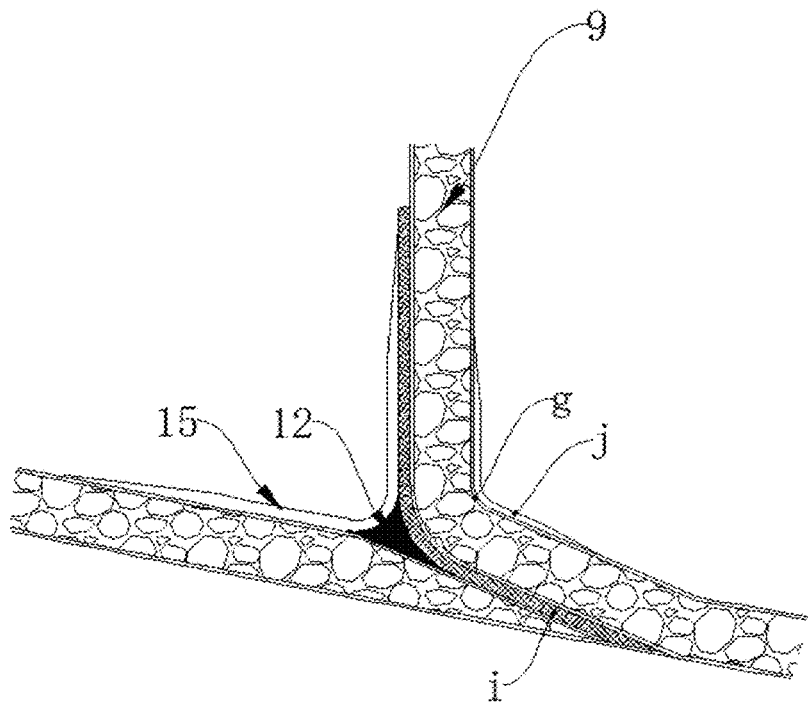
FIG. 11 is the structural representation of the another form of connection between the trailing edge module and the intermediate module in Embodiment 4 of the present invention.

The only difference between this embodiment and Embodiment 3 lies in the placement position of the structural adhesive layer i between the intermediate module 42 and the trailing edge module 41, as shown in FIGS. 10-11, and the rest of the structure is the same, which will not be repeated here.

Specifically, a bonding corner layer 15 is provided at the splice of the trailing edge module 41 and the intermediate module 42. One side of the bonding corner layer 15 is bonded and fixed to the trailing edge module 41 and the other side forms a corner splicing surface 11 with the inner skin of the trailing edge module 41. The corner splicing surface 11 is bonded and fixed to the trailing edge module by means of a structural adhesive layer i.

Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A chordwise segment connection structure for modularized wind turbine blades, comprising: a blade body including a pressure side and a suction side;
  a leading edge shell and a trailing edge shell formed by a skin of the pressure side and the suction side along a chord length of a blade, the pressure side and the suction side between the leading edge shell and the trailing edge shell being each provided with a spar cap;
  a shear web provided in a cavity of the blade body and extending between the pressure side and the suction side to support the spar caps;
  wherein the spar caps on the pressure side and the suction side are bonded and fixed to a skin structure where the leading edge shell and the trailing edge shell are spliced, so that the leading edge shell and the trailing edge shell are spliced with the spar caps to form the profile of the wind turbine blade;
  wherein the spar caps are provided on an outside of an outer skin of the skin structure, the skin structure being bent towards an inside of the cavity on each of the pressure side and the suction side to form a first connection surface and second connection surface located at either end of the first connection surface, and the first connection surface being of an arc-shaped structure projecting towards the outside and the second connection surface being of a planar structure; and wherein the spar caps are bonded and fixed to the first connection surface and the second connection surface by means of a structural adhesive layer on either the pressure side or the suction side, and the spar caps are provided with a reinforcement layer on the outside, the reinforcement layer being spliced to the outer skin of the leading edge shell and the trailing edge shell, and the shear web being bonded to an inner skin adjacent where the spar caps are located.

2. The chordwise segment connection structure for modularized wind turbine blades according to claim 1, wherein a trailing edge web is provided within the trailing edge shell and parallel to the shear web, an edge extending from the trailing edge web is bonded and fixed to the inner skin of the trailing edge shell.

3. The chordwise segment connection structure for modularized wind turbine blades according to claim 1, wherein the leading edge shell has a chamfered transition at a splice between the pressure side and the suction side;

wherein the trailing edge shell comprises a trailing edge module and an intermediate module, the intermediate module including a trailing edge web provided at the splice between the pressure side and the suction side and a first receiving surface and a second receiving surface extending along both ends of the trailing edge web towards the leading edge shell; and wherein a bonding corner layer is provided at a splice of the trailing edge module and the intermediate module, one side of the bonding corner layer being bonded and fixed to the trailing edge web and the other side forming a splicing surface with the first receiving surface or the second receiving surface, the splicing surface being bonded and fixed to an inside of the inner skin of the trailing edge module by means of a structural adhesive layer.

4. The chordwise segment connection structure for modularized wind turbine blades according to claim 3, wherein a reinforcement structure is provided at a corner formed between the splicing surface and the inside of the inner skin of the trailing edge module, the trailing edge web and the first receiving surface or the second receiving surface close to the reinforcement structure forming a rounded structure on the outer side thereof and an angle structure on the inner side thereof; and wherein both the rounded structure and the angle structure are provided with a hand layup reinforcement layer.

5. The chordwise segment connection structure for modularized wind turbine blades according to claim 1, wherein a corner reinforcement layer is provided at a joint between the shear web and the inner skin, the corner reinforcement layer being an L-shaped structure, and wherein a resin paste layer is added at a gap of the corner reinforcement layer; and wherein a structural adhesive layer is provided at the corner reinforcement layer close to the trailing edge shell, and a horizontal connection part of the corner reinforcement layer is fixedly connected to the inner skin by means of the structural adhesive layer.

6. The chordwise segment connection structure for modularized wind turbine blades according to claim 1, wherein a trailing edge module is provided with a wraparound reinforcement layer on the outside of the outer skin of a trailing edge beam; and wherein the trailing edge beam is provided between the inner skin and the outer skin, and a structural adhesive layer is provided between the trailing edge beam and the inner skin.

7. The chordwise segment connection structure for modularized wind turbine blades according to claim 1, wherein the width of the spar cap on the pressure side is larger than that of the spar cap on the suction side.

* * * * *